United States Patent
Cavataio et al.

(10) Patent No.: US 8,978,360 B2
(45) Date of Patent: Mar. 17, 2015

(54) HYDROCARBON AND NOX TRAP

(75) Inventors: Giovanni Cavataio, Dearborn, MI (US); Jason Aaron Lupescu, Ypsilanti, MI (US); Shane Elwart, Ypsilanti, MI (US); James Michael Kerns, Trenton, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 12/560,038

(22) Filed: Sep. 15, 2009

(65) Prior Publication Data

US 2011/0061371 A1 Mar. 17, 2011

(51) Int. Cl.
*F01N 3/00* (2006.01)
*F01N 1/00* (2006.01)
*F01N 3/08* (2006.01)
*F01N 3/035* (2006.01)
(Continued)

(52) U.S. Cl.
CPC .............. *F01N 3/0807* (2013.01); *F01N 3/035* (2013.01); *F01N 3/0835* (2013.01); *F01N 3/0842* (2013.01); *F01N 3/085* (2013.01); *F01N 3/101* (2013.01); *F01N 3/103* (2013.01); *F01N 3/2803* (2013.01); *F01N 9/00* (2013.01); *F02M 25/074* (2013.01); *F01N 13/0097* (2014.06); *F01N 3/0821* (2013.01); *F01N 2240/36* (2013.01); *F01N 2370/04* (2013.01); *F01N 2410/02* (2013.01); *F01N 2510/06* (2013.01); *F01N 2510/063* (2013.01); *F01N 2510/0684* (2013.01); *F01N 2560/02* (2013.01); *F01N 2570/12* (2013.01); *F01N 2570/14* (2013.01); *Y02T 10/121* (2013.01); *Y02T 10/47* (2013.01); *Y02T 10/22* (2013.01); *Y02T 10/24* (2013.01)
USPC .................................. 60/286; 60/297; 60/324

(58) Field of Classification Search
CPC ..... F02M 33/02; F02M 33/025; F02M 33/08; F01N 3/2033
USPC ............ 60/297, 311, 286; 422/169, 176, 177; 502/527.12, 325; 123/516, 518, 519, 123/520, 521
See application file for complete search history.

(56) References Cited

U.S. PATENT DOCUMENTS 5,207,734 A * 5/1993 Day et al. ......................... 60/278
5,272,873 A * 12/1993 Hamazaki ........................ 60/283
(Continued)

FOREIGN PATENT DOCUMENTS

WO WO 2008/108141 A1 * 12/2008 ................ F01N 3/24

*Primary Examiner* — Kenneth Bomberg
*Assistant Examiner* — Jason Sheppard
(74) *Attorney, Agent, or Firm* — Julia Voutyras; Alleman Hall McCoy Russell & Tuttle LLP

(57) ABSTRACT

A hydrocarbon and NOx trap and related apparatus and methods for reducing cold-start NOx emissions from an engine are provided. In one embodiment a trap includes a first, topmost layer, exposed to an exhaust gas flow path of exhaust gases from an engine, the first layer comprising a zeolite, a second layer, substantially covered by the topmost layer, the second layer comprising a NOx adsorbing material and a monolithic substrate, directly supporting the second layer and indirectly supporting the first layer, the substrate providing a substantially rigid structure of the trap. In this way, engine emissions, such as NOx and hydrocarbons may be adsorbed over the exhaust trap at low temperature and then thermally released, limiting cold start emissions beyond engines that only include a lean NOx trap.

14 Claims, 5 Drawing Sheets

(51) Int. Cl.
*F01N 3/10* (2006.01)
*F01N 3/28* (2006.01)
*F01N 9/00* (2006.01)
*F02M 25/07* (2006.01)
*F01N 13/00* (2010.01)

(56) References Cited

U.S. PATENT DOCUMENTS

| | | | |
|---|---|---|---|
| 5,544,483 A * | 8/1996 | Heuer | 60/283 |
| 5,653,103 A * | 8/1997 | Katoh | 60/283 |
| 5,806,304 A * | 9/1998 | Price et al. | 60/274 |
| 6,164,065 A * | 12/2000 | Denari et al. | 60/284 |
| 6,518,213 B1 | 2/2003 | Yamamoto et al. | |
| 6,589,901 B2 | 7/2003 | Yamamoto et al. | |
| 6,896,857 B2 | 5/2005 | Nakamura et al. | |
| 7,119,044 B2 * | 10/2006 | Wei et al. | 502/300 |
| 7,306,771 B2 * | 12/2007 | Okawara | 422/177 |
| 7,331,334 B2 * | 2/2008 | Leone et al. | 123/516 |
| 7,640,731 B2 * | 1/2010 | Huang | 60/297 |
| 8,006,485 B2 * | 8/2011 | Twigg et al. | 60/295 |
| 2001/0011539 A1 * | 8/2001 | Ito et al. | 123/518 |
| 2003/0115855 A1 | 6/2003 | Miyoshi et al. | |
| 2004/0166036 A1 * | 8/2004 | Chen et al. | 422/180 |
| 2010/0043410 A1 * | 2/2010 | Wakao et al. | 60/287 |
| 2010/0064686 A1 * | 3/2010 | Mondori | 60/605.2 |
| 2010/0199635 A1 * | 8/2010 | Akama et al. | 60/274 |
| 2011/0047987 A1 * | 3/2011 | Yoda et al. | 60/287 |
| 2011/0107746 A1 * | 5/2011 | Matsumoto et al. | 60/297 |
| 2011/0126525 A1 * | 6/2011 | Han et al. | 60/287 |

* cited by examiner

HYDROCARBON AND NOX TRAP

TECHNICAL FIELD

The present application relates to reducing NOx emissions from an engine, and more particularly, to a hydrocarbon and NOx trap used to store and/or mitigate such engine emissions.

BACKGROUND AND SUMMARY

When operating a vehicle at low temperatures (e.g., during engine cold-start), exhaust aftertreatment devices are not catalytically active enough to reduce engine emissions, such as hydrocarbons and oxides of nitrogen (NOx). In one approach, (e.g., U.S. Pat. No. 6,518,213), a three-way catalyst is deposited on a hydrocarbon trap positioned in an engine's exhaust, so that NOx is adsorbed by the three-way catalyst and hydrocarbons by the trap during low temperatures.

However, the inventors herein have recognized various issues with such an approach. For example, during low exhaust temperatures, such as during cold start, hydrocarbon and sulfur emissions may also be present in exhaust gases. Directly exposing a NOx adsorbing material (such as a three-way catalyst) to such emissions may foul the NOx adsorbing material, leading to degraded performance and an increase in NOx entering the environment. Further, a three-way catalyst may not be as effective at adsorbing NOx at low temperatures as a different NOx adsorber, such as a lean NOx trap.

Accordingly, as a brief summary, devices, systems and methods are disclosed for a hydrocarbon and NOx trap. In one example, a trap, such as a hydrocarbon and NOx trap, for reducing emissions from an engine, such as cold-start NOx emissions, includes a first, topmost layer, exposed to an exhaust gas flow path of exhaust gases from the engine, the first layer comprising a zeolite, a second layer, covered by the top most layer, the second layer comprising a NOx adsorbing material, and a monolithic substrate, directly supporting the second layer and indirectly supporting the first layer, the substrate providing a substantially rigid structure of the trap.

In this way, engine emissions, such as NOx and hydrocarbons may be adsorbed over the exhaust trap at low temperature and then thermally released, limiting cold start emissions beyond engines that only include a lean NOx trap. In one example, emissions are released when one or more further exhaust aftertreatment devices are warmed up and treating exhaust gas (e.g., oxidizing hydrocarbons and reducing NOx). Further, because the second layer is covered by the first layer, fouling of the NOx adsorbing material included in the second layer by hydrocarbons, sulfurous compounds and the like may be prevented.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The following description relates to systems and methods for the storage and treatment of low temperature NOx and hydrocarbon emissions. Such emissions may be present, for example, during cold-start. First an overview of vehicle related systems are introduced and then an example hydrocarbon and NOx trap is presented, as well as related systems, apparatus, and methods.

Figure 1:
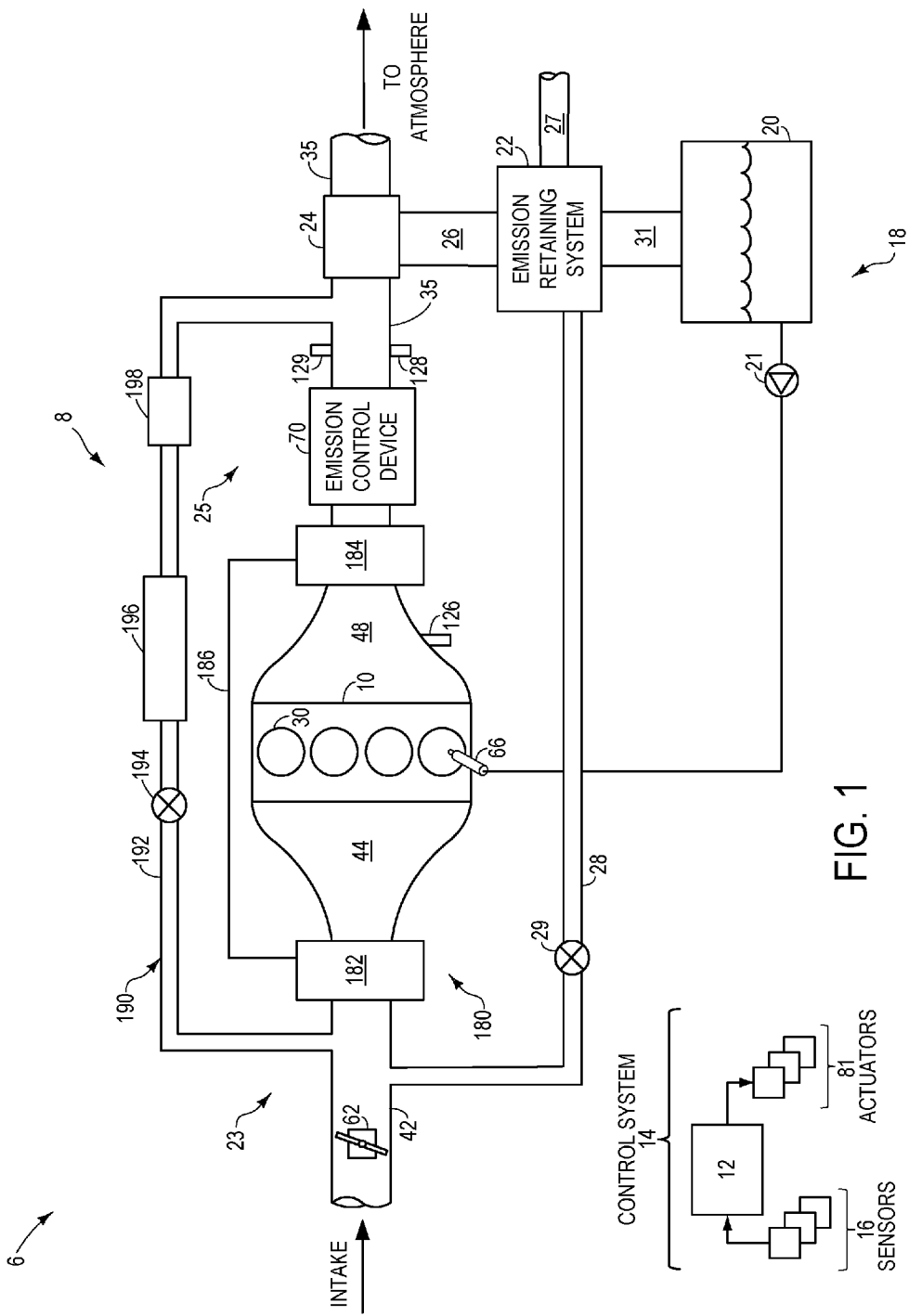
FIG. 1 shows engine systems including a schematic depiction of a vehicle.

FIG. 1 shows a schematic depiction of a vehicle system 6. The vehicle system 6 includes an engine system 8 coupled to an emission retaining system 22 and a fuel system 18. Emission retaining system 22 may include one or more devices for the storage and treatment of engine emissions such as oxides of nitrogen (NOx), hydrocarbons, and sulfurous compounds. The engine system 8 may include an engine 10 having a plurality of cylinders 30. In some examples, engine 10 is a lean-burn gasoline engine. In other examples, engine 10 is a diesel engine. The engine system 10 may include turbocharger 180 and exhaust gas recirculation (EGR) system 190, discussed in more detail below. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be an exhaust aftertreatment device and may be mounted in a close-coupled position in the exhaust to minimize a duration of time needed to warm-up emission control device 70. One or more emission control devices may include a three-way catalyst, lean NOx trap, diesel particulate filter, oxidation catalyst, etc. In further examples, emission control device may include an example hydrocarbon and NOx trap described below. It will be appreciated that other components may be included in the engine such as a variety of valves and sensors, as further elaborated in the example engine of FIG. 2.

The engine exhaust 25 may also be operatively coupled to emission retaining system 22 via conduit 26 and valve 24. In one example, exhaust gases may be routed to the emission retaining system 22 during engine cold start operation. Then, once the emission control device 70 has reached its operating temperature, the hydrocarbons and NOx retained in system 22 may be purged to the engine via engine intake 23, as described below herein.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel system. Vapors generated in the fuel system 18 may be routed to emission retaining system 22, described further below, via conduit 31, before being purged to the engine intake 23.

The fuel tank 20 may hold a plurality of fuel blends, including diesel fuel and various biofuel blends, fuel with a range of alcohol concentrations, such as various gasoline-ethanol blends, including E10, E85, gasoline, etc., and combinations thereof.

Turbocharger 180 includes a compressor 182, schematically shown as linked to turbine 184 via turbo shaft 186. Additionally, turbocharger 180 may be a supercharger, lacking turbine 184 and may be mechanically linked to a crankshaft. Further still, compressor 182 may be driven, at least partially by an electric motor (not shown).

EGR system 190 includes an EGR conduit 192 and an EGR valve 194. EGR conduit 192 directs, at least partially, exhaust gas flow from exhaust passage 35 back to intake passage 42, upstream of compressor 182. In the present example, EGR conduit 192 is shown coupled to exhaust passage 35 downstream of emission control device 70, as well as sensors 128 and 129. However, in additional examples, EGR conduit 192 may be coupled to exhaust passage 35 upstream of emission control device 70, upstream of turbine 184 and/or, directly to exhaust manifold 48. In still further examples, EGR conduit 192 may couple directly to intake manifold 44, downstream of compressor 182. EGR valve 194 may be an on/off valve or variable valve.

In the present example EGR system 190 is a low pressure EGR loop. Further, in examples EGR conduit 192 may be coupled to the exhaust and intake in a variety of ways to produce additional or alternate low pressure (LP) and high pressure (HP) loops. EGR system 190 may also include a device coupled to EGR conduit 192, or placed intermediately along EGR conduit 192 for cooling air within EGR conduit 192, such as an intercooler 196. Further still, an emission control device, such as emission control device 70, or a hydrocarbon and NOx trap may be located and/or disposed at 198 within the EGR system 190, or in further locations along EGR conduit 192. In such examples, EGR valve 194 may control flow through the device at 198. The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, air/fuel ratio, and composition sensors may be coupled to various locations in the vehicle system 6, as discussed in more detail herein. As another example, the actuators may include fuel injector 66, valve 29, valve 24, valve 194 and throttle 62. The control system 14 may include a controller 12. The controller may receive input data from the various sensors, process the input data, and trigger the actuators in response to the processed input data based on instruction or code programmed therein corresponding to one or more routines.

Emission retaining system 22 may include one or more emission retaining devices, such as a hydrocarbon and NOx trap described in more detail below, configured to store and/or treat hydrocarbon and NOx emissions. Emission retaining system 22 may further include a vent 27 which may route gases out of the retaining system 22 to atmosphere when storing, or trapping, emissions from the engine exhaust 25 and/or fuel system 18. Vent 27 may also allow fresh air to be drawn into emission retaining system 22 when purging stored emissions, (e.g. hydrocarbons or NOx) from the engine exhaust 25 and/or fuel system 18 to the engine intake 23 via purge conduit 28 and purge valve 29. While this example shows vent 27 communicated with fresh, unheated air, various modifications may also be used. For example, heated intake air from an air cleaner box may be used. Further, heated exhaust gas may be used under selected conditions. A detailed system configuration of emission retaining system 22 is described herein below with regard to FIGS. 5 and 6. Further various additional components may be included in the intake, exhaust, and fuel system, such as a muffler downstream of valve 24.

Under some operating conditions, such as during engine starts when the emission control device is not yet to its light-off temperature (e.g., a temperature at which the device reaches a selected, sufficiently high, conversion efficiency for a particular exhaust constituent), exhaust gas may be routed from the engine exhaust 25 to the emission retaining system 22, and then to the atmosphere through vent 27. In one example, an increased amount of cold-start hydrocarbon and NOx emissions may be stored in emission retaining system 22 while the exhaust gases heat emission control device 70. Then, once device 70 reaches sufficient operating temperature (e.g., emission control device 70 is above a cold-start threshold), exhaust gases may be routed to the atmosphere through conduit 35 and the emission retaining system 22 may be substantially isolated from the engine exhaust gas. Additionally, fuel vapors generated in the fuel tank 20 may be routed to emission retaining system 22 for storage before being delivered to the engine intake 23 and combusted in the engine 10. These different storing modes (from engine exhaust 25, and from fuel system 18) may be carried out concurrently, separately, or in combinations thereof.

After being isolated from the exhaust gas, the emission retaining system 22 may be coupled to the engine intake to draw fresh air through vent 27 and purge stored emissions into the engine intake. Such purging operation may occur during selected engine operating conditions as described herein. Alternatively, the stored hydrocarbons may be purged using cleaned exhaust gas. In still other examples, the stored hydrocarbons may be purged using a temperature controlled combination of cleaned exhaust gas and fresh air.

Figure 2:
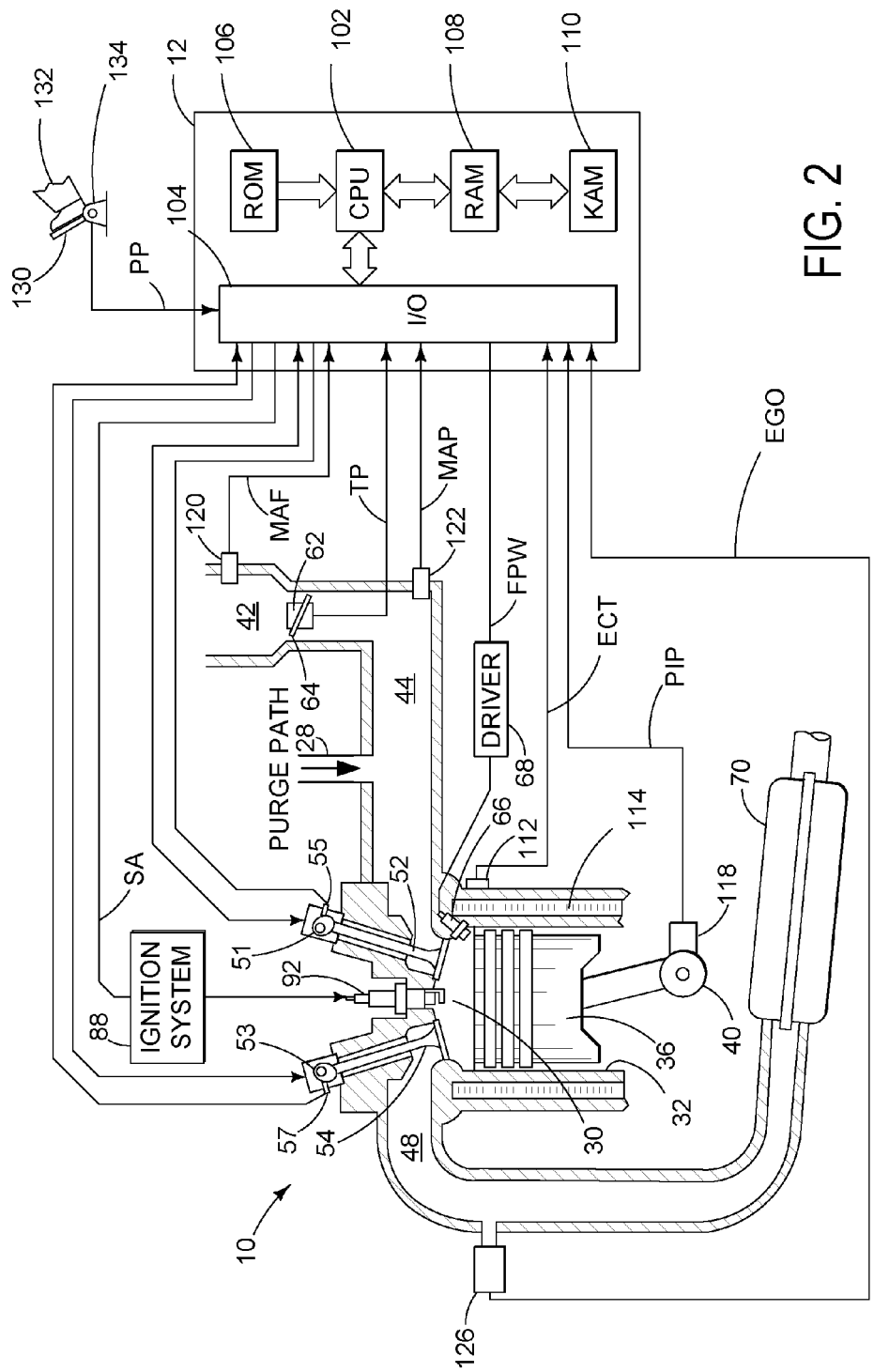
FIG. 2 is a schematic diagram showing one cylinder of multi-cylinder engine.

FIG. 2 is a schematic diagram showing one cylinder of multi-cylinder engine 10. As described with regard to FIG. 1, engine 10 may be controlled at least partially by a control system including controller 12, as well as by input from a vehicle operator 132 via an input device 130. In this example, input device 130 includes an accelerator pedal and a pedal position sensor 134 for generating a proportional pedal position signal PP. Combustion chamber or cylinder 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves. The intake manifold may include a purge path 28 fluidly coupled to the exhaust stream allowing purge vapors to be delivered to the engine intake manifold 44. While this example shows the purge path downstream of the throttle to enable manifold vacuum to draw in the gases, various other configurations may also be used. For example, in the case of a turbocharged engine, the purge line(s) may lead to upstream of the turbocharger compressor inlet.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include throttle 62 having a throttle plate 64. In this particular example, the position of throttle plate 64 may be varied by controller 12 via a throttle position signal TP provided to an electric motor or actuator included with throttle 62, a configuration that is commonly referred to as electronic throttle control (ETC). In this manner, throttle 62 may be operated to vary the intake air provided to combustion chamber 30 among other engine cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three-way catalyst (TWC), NOx trap, various other emission control devices, or combinations thereof (as described above with reference to FIG. 1). In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF); engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal (MAP) from sensor 122. Engine speed signal, RPM, may be generated by controller 12 from signal PIP. Manifold pressure signal MAP from a manifold pressure sensor may be used to provide an indication of vacuum, or pressure, in the intake manifold.

As described above, FIG. 2 shows only one cylinder of a multi-cylinder engine 10, however each cylinder may similarly include its own set of intake/exhaust valves, fuel injector, spark plug, etc.

Figure 3:
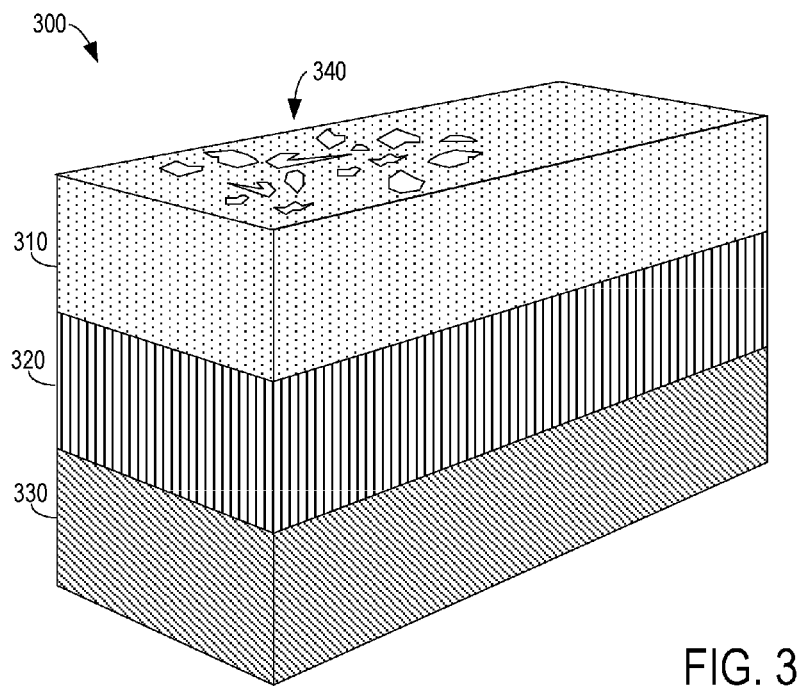
FIG. 3 shows an example section of a hydrocarbon and NOx trap.

FIG. 3 shows an example section of a hydrocarbon and NOx trap 300. The hydrocarbon and NOx trap 300 is one example of a cold-start NOx storage catalyst for storage and treatment of cold-start hydrocarbon and NOx emissions from an engine. The trap includes a first, topmost layer 310, exposed to an exhaust gas flow path of exhaust gases from the engine and may be made of, or include, a zeolite. Layer 310 may adsorb chemicals form exhaust, such as hydrocarbons and sulfurous compounds, preventing fouling of the remaining trap elements.

The trap further includes a second layer 320, covered by the top most layer 310. As used herein, covered by the top most layer may include being substantially covered by the top most layer, in that the layers may be porous, for example, and thus one layer may not, although it could, completely cover another layer.

The second layer 320 may be made of or include a NOx adsorbing material. The materials within the composition of the second layer 320 adsorb NOx gas from the exhaust. In some examples the second layer 320 includes lean NOx adsorber materials. The second layer 320 may include a basic salt; additionally or alternately, the layer may include a basic oxide. As an example, the second layer 320 includes an ionized alkali metal and/or alkaline earth metal bonded with carbonate. The second layer may contain oxides of alkali metals (e.g., Li, Na, K, Rb, Cs), alkaline earth metal metals (e.g., Mg, Ca, Sr, Ba) and rare earth metals such as La, Ce, Pr, Nd. The second layer 320 may be a middle layer between a substrate 330 and the first layer 310. Because the second layer 320 is covered by the first layer 310, second layer 320 may be protected from fouling by hydrocarbons and/or sulfurous compounds.

In the present example, monolithic substrate 330 directly supports the second layer 320 and indirectly supports the first layer 310. As used herein, direct support may include the second layer 320 having no other layers between itself and substrate 330. Further the monolithic substrate 330 provides a substantially rigid structure of the trap 300. In some examples the substrate 330 may be honeycomb-shaped in order to increase surface area of the trap 300. The monolithic substrate 330 may include metal, cordierite, fiber, silicon carbide, ceramic, and the like. In one example, a diesel particulate filter (DPF) substrate is adapted as a monolithic substrate 330 with multiple washcoats and layers deposited on the interior and exterior walls. Further still, monolithic substrate 330 may be a support of any stable material (ceramic, metallic, etc.) designed for a gas to flow through (i.e. honeycomb monolith, extruded zeolite monolith, etc.).

Further the hydrocarbon and NOx trap may include one or more washcoats 340. In the present example, washcoat 340 may include a metal oxide. In some examples, washcoat 340 includes at least one of silica and alumina to increase the surface area of the trap 300. In further examples, the washcoat 340 includes oxides of Zr, Ti, and Al or similar such compounds. Further still, the washcoat 340 may include a catalyst for at least one of a hydrocarbon oxidation reaction and NOx reduction reaction. In one such example, washcoat 340 includes a typical DeNOx modulation catalyst, such as a platinum group metal or similar such material, (e.g., Pt, Ph, Pd, Au, and Ag). In a further example, the washcoat 340 includes Cu, Fe, or Cs metals such as may be found in a hydrocarbon selective catalytic reduction (HC-SCR) or an ammonia selective catalytic reduction (NH3-SCR) catalyst system. In one example, the first layer 310 including zeolite and a washcoat including copper may act as a sulfur trap across lean and rich air-to-fuel ratios, and preventing sulfur fouling of the second layer. One or more washcoats may be present on the first layer 310 (as shown), and additionally or alternately may be present in the first or second layers (310 and 320 respectively), as well as be deposited on the surfaces of the first and second layer and substrate (310, 320, and 330 respectively).

By including one or more washcoats 340 on hydrocarbon and NOx trap 300, emissions that are trapped on at least one of the first layer 310, and second layer 320 may be reduced and/or oxidized. In this way, trapped emissions may be mitigated on the trap when catalysts on the trap have reached a light-off temperature without use of further exhaust aftertreatment devices.

Figure 4:
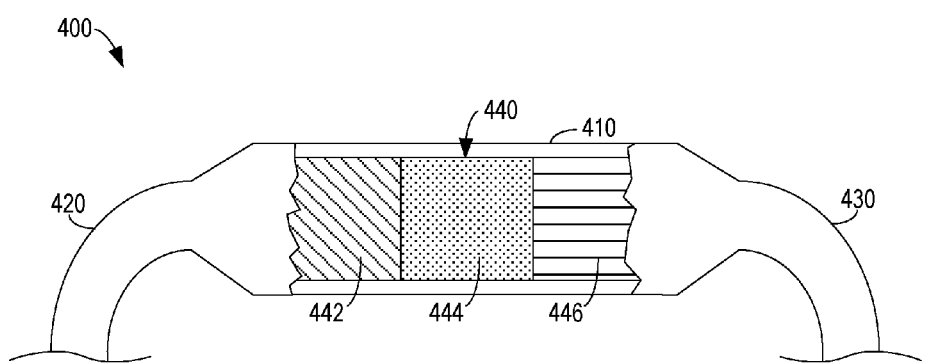
FIG. 4 shows a cut away view of a hydrocarbon and NOx trap assembly.

Turning now to FIG. 4, a cut away view of a hydrocarbon and NOx trap assembly 400 is shown. In the present example, assembly 400 includes a housing 410, coupled to an inlet pipe 420 and an outlet pipe 430. Assembly 400 receives exhaust gases from upstream via inlet pipe 420 and outlets gas downstream via outlet pipe 430. Housing 410 retains and supports hydrocarbon and NOx trap 440 in the present example. Housing 410, inlet pipe 420 and outlet pipe 430 are all sealed and hydrocarbon and NOx trap 440 is mounted within housing 410 so that exhaust flows across the trap 440.

In the present example, hydrocarbon and NOx trap 440 is arranged in three zones. In some examples the hydrocarbon and NOx trap 410 comprises an example single monolithic substrate which may be a catalyst support. In these examples, zones 442, 444, and 446 are on a single brick, each including washcoats, chemical deposits, layers and/or chemical linings on the exterior and/or interior walls of the monolith. In this way, hydrocarbon and NOx trap 440 may comprise zones, arranged one after another along a lateral direction of a brick. Throughout the examples, each exemplary hydrocarbon and NOx trap includes, at the least, an example first layer, second layer, and substrate as described above with reference to FIG. 3. Zones 442, 444 and 446 may be placed in series, as shown in FIG. 4, however in additional examples, at least two zones may also be arranged parallel to one another and the hydrocarbon and NOx trap may comprise a single zone, two zones or greater than three zones. By placing differing trap and exhaust aftertreatment elements in series and parallel, hydrocarbon and NOx trap assembly 400 may effectively deal with a range of exhaust gas compositions across different air-to-fuel levels and temperatures.

In a first example, hydrocarbon and NOx trap 440 comprises a first zone 442 including a hydrocarbon retention device (e.g., a device including at least one of activated charcoal, comprising micropore (0.5 nm pore size range) activated carbon, or zeolites), and a second zone 444 including an example first layer, second layer, and substrate, as described above. In a second example, hydrocarbon and NOx trap 440 includes a first zone 444 including the first layer, second layer, and substrate and a second zone 446 including a three-way catalyst. In a third example hydrocarbon and NOx trap 440 includes a first zone 442 including a diesel oxidation catalyst, and a second zone 446 including the first layer, second layer, and substrate. In a fourth example hydrocarbon and NOx trap 440 includes a first zone 442 including a lean NOx trap, and a second zone 444 including the first layer, second layer, and substrate. In further examples, emission control device 400 includes a plurality of catalyst supports arranged as bricks coupled together, instead of a single monolithic substrate. In such examples, one brick is a hydrocarbon and NOx trap including one or more zones and further bricks are traps, catalytic converters and the like, arranged in parallel or in series.

As described above, with reference to FIG. 3, example hydrocarbon and NOx trap 440 may have a monolithic substrate that is a shape providing a high quantity of surface area, such as a honeycomb shape. The monolithic substrate may include metal, cordierite, fiber, silicon carbide, ceramic, and the like, or may be an adapted DPF substrate (as described above).

Hydrocarbon and NOx trap assembly 400 may be included in a system or apparatus of an engine. One example is the optional hydrocarbon and NOx trap at 198 as shown in EGR system 190, described above with reference to FIG. 1. An additional example is emission retaining system 22, also described with reference to FIG. 1.

Figure 5:
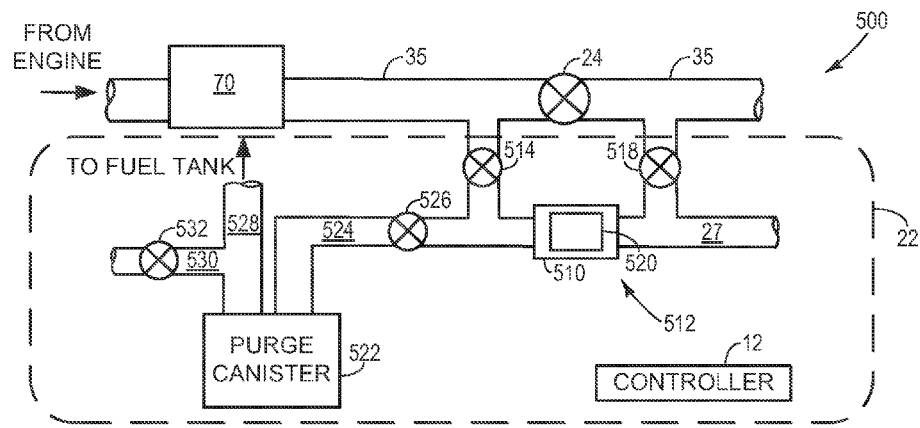
FIG. 5 shows a first example apparatus, including a first embodiment of an emissions retaining system.

Turning now to FIG. 5, an apparatus 500 is shown, including an embodiment of emissions retaining system 22. Apparatus 500 includes emission control device 70, which in one example is a catalytic converter. Further, emissions retaining system 22 includes a hydrocarbon and NOx trap assembly 510. Further examples of emissions retaining system 22 are described below, with reference to FIG. 6, and in the HC retaining systems disclosed in U.S. applications Ser. Nos. 12/182,777, 60/987,350 and 61/081,686. By including an example hydrocarbon and NOx trap assembly 510 within an engine apparatus, (e.g., apparatus 500, and 600), NOx and hydrocarbons thermally released from hydrocarbon and NOx trap 520 may be returned to the engine, or delivered to further exhaust aftertreatment devices, which may prevent emissions from leaving an example vehicle and entering the environment.

In the present example, emission control device 70 is a catalytic converter lowering a rate-limiting free energy change to a transition state of a reaction of at least one of reducing NOx and oxidizing hydrocarbons. As discussed above, with reference to FIGS. 1 and 2, the catalytic converter is coupled downstream of an example exhaust manifold of a combustion engine and may be a TWC diesel oxidation catalyst, selective catalytic reduction (SCR) system, a hydrocarbon and NOx trap, and/or a DPF. What is more, emission control device 70 may further include, at least one of silica and alumina (metal oxide), the at least one of silica and alumina increasing at catalyst surface area.

In the present example a hydrocarbon and NOx trap assembly 510 is arranged in parallel with exhaust conduit 35, downstream of the emission control device 70, and canister 522. A diverter valve 24 is located in the exhaust conduit 35 for selecting between at least an open state and a closed state. The emission retaining system 22 of FIG. 3 may be operated by a controller in a plurality of modes by selective adjustment of the various valves. A first operating mode may include blocking exhaust flow while diverter valve 24 is in a closed state. A second operating mode may include allowing exhaust flow to pass while diverter valve 24 is in an open state. A first mode may include an exhaust temperature below a cold-start threshold. The second operating mode may include an exhaust temperature above a cold-start threshold. In this way, switching between first and second operating modes may be done in response to exhaust temperature change.

A bypass conduit 512 is coupled upstream and downstream of the diverter valve 24. Further, the bypass conduit 512 includes a first bypass valve 514, assembly 510, and a second bypass valve 518. In this example, assembly 510 may include one or more bricks, as discussed above with reference to FIG. 4. In the present example, a single brick hydrocarbon and NOx trap 520 is included in assembly 510. Further, the bypass conduit 512 leads to the atmosphere through vent 27, which is an optional structure, and bypass conduit 512 may further lead to valve 518 and conduit 35.

Furthermore, assembly 510 may be fluidly coupled to a purge canister 522 via passage 524. The purge canister 522 may be configured to collect vapor from the fuel system, such as via a conduit 528 leading to the fuel tank 20. The passage 524 may include a valve 526. The purge canister 522 may also be fluidly coupled to the engine intake via a conduit 530 and valve 532. The canister 522 may include activated charcoal of a high, porosity.

In one operating mode, hydrocarbon and NOx trap store hydrocarbons and NOx at low temperatures (e.g., below a cold-start threshold) and in a second operating mode (e.g., above a cold-start threshold), thermally release the hydrocarbons and/or NOx back into gas circulation, for example, to be reduced over emission control device 70. Additionally, emissions may be reduced or oxidized downstream on a zone included on hydrocarbon and NOx trap 520.

In another such example, emission control device 70 or a further emissions aftertreatment device, is positioned downstream of trap assembly 510. Diverter valve 24 may select between, a first pathway flowing exhaust to the hydrocarbon and NOx trap 520, and flowing exhaust gas along the second pathway, avoiding the hydrocarbon and NOx trap 520. The diverter valve 24 may flow exhaust gas along the first pathway when an exhaust temperature is less than or equal to a catalyst light-off temperature, and the first pathway may further include a path downstream of the hydrocarbon and NOx trap, returning exhaust gas to the engine. The diverter valve 24 may flow exhaust gas along the second pathway when the exhaust temperature is equal to or greater than the catalyst light-off temperature and the second pathway may bypass exhaust flow around the hydrocarbon and NOx trap 520 and may further flow exhaust out of the engine system to the environment.

Figure 6:
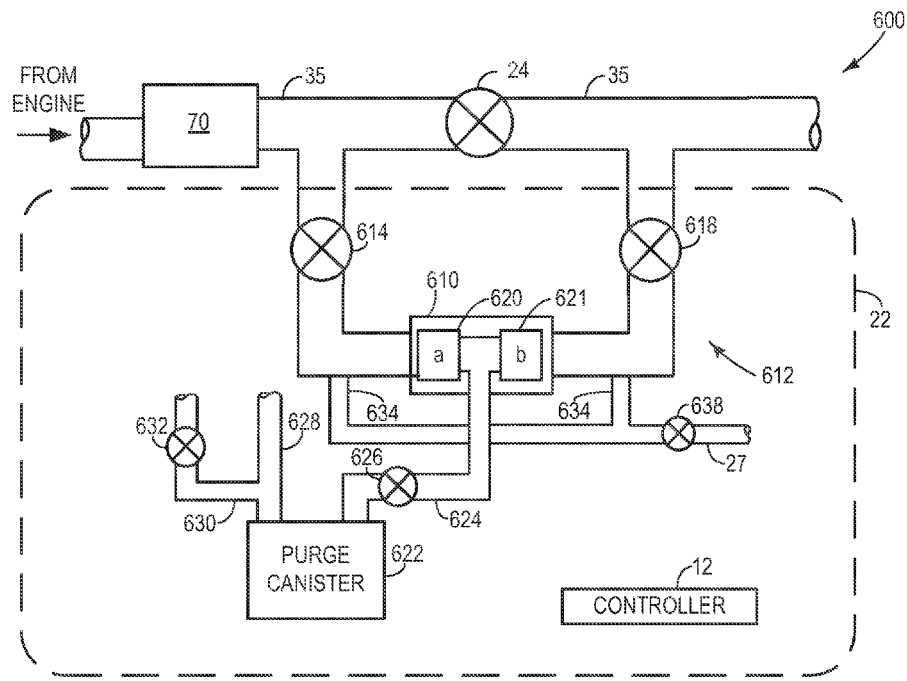
FIG. 6 shows a second example apparatus, including a second embodiment of an emissions retaining system.

FIG. 6 shows a further example apparatus 600 including a second embodiment of the hydrocarbon retaining system 22. This embodiment is similar to that of FIG. 5, except that the hydrocarbon and NOx trap assembly 610 includes two bricks 620 and 621 and is configured to pass exhaust gasses serially through the bricks, but purge them in parallel. Specifically, the system of FIG. 6 includes device 610 arranged in parallel with exhaust conduit 35, downstream of the emission control device 70. A diverter valve 24, which in this example may be a throttle, is located in the exhaust conduit for blocking exhaust flow during a first mode, and allowing exhaust flow to pass during a second mode. A bypass conduit 612 is coupled upstream and downstream of the diverter valve 24. Further, the bypass conduit 612 includes a first bypass valve 614, assembly 610, and a second bypass valve 618. The bypass conduit 612 is also coupled to vent 27 via two parallel passages 634 and valve 638.

Furthermore, assembly 610 is fluidly coupled to a purge canister 622 via passage 624. The purge canister 622 may be configured to collect vapor from the fuel system, such as via a conduit 628 leading to the fuel tank 20 (not shown). The purge canister 622 may also be fluidly coupled to the engine intake via a conduit 630 and valve 632. The hydrocarbon retaining system of FIG. 6 may be operated by a controller in a plurality of modes by selective adjustment of the various valves, as described above with respect to FIG. 5. Further the following operating modes may be performed in apparatus 600 (and adopted for apparatus 500):

MODE A: exhaust hydrocarbon storage

During select engine and/or vehicle operating conditions, the controller 12 may close valves 24 and 638, and open valves 614 and 618. Additionally, valve 632 is closed. Example operating conditions include cold engine starting operation before the emission control device has reached a light-off temperature. In this mode, exhaust from engine 10 is routed through assembly 610 (sequentially through bricks 620 and then 621) before exiting to the atmosphere via conduit 35, while the purge canister 622 is effectively isolated from the exhaust gas as the flow is deadheaded against valve 626.

MODE B: fuel vapor storage

During select engine and/or vehicle operating conditions, the controller 12 may open valves 24, 626, and 638, and close valves 614 and 618. Valve 632 may also be closed. The exhaust gases are thus isolated from the canister 622 and assembly 610. In this mode, at least some fuel tank vapors are routed through and retained in both purge canister 622 and assembly 610 before being vented through valve 638 and vent 27. In particular, the fuel vapors are first routed through canister 622 and then routed, in parallel through bricks 620 and 621, respectively, before being vented through 27. In this way, hydrocarbons such as fuel tank vapors and NOx emissions may be stored in different concentrations at different locations of the assembly 610, due to the different direction of flow of exhaust gas and fuel tank vapors, at least from brick 620.

MODE C: HC trap and/or canister purging

During select engine and/or vehicle operating conditions, the controller 12 may open valve 24 and 638, and close valves 614 and 618. Additionally, valve 632 may be open to a controlled amount, such that fresh air is drawn through vent 27 to purge assembly 610 and purge canister 622 through 630 and valve 632 to the engine intake 25. In this mode, the purged fuel vapors, unburnt hydrocarbons, NOx and additional emissions from the canister and/or device 610 are returned to the engine, while exhaust gas is routed through conduit 35 to the atmosphere after treatment by the emission control device. Again, in flow movement opposite to that of MODE B described above, fresh air is routed in parallel to bricks 620 and 621, before being combined and routed through purge canister 622. In this way, purging of vapors occurs in a direction opposite to that of fuel tank vapor storing in both bricks, and opposite to the direction of exhaust gas hydrocarbon storing in at least one brick of 620 and 621.

Such differential storing and purging directions, making use of both serial storing and parallel purging, can enable improved storage and release, thus increasing efficiency of the engine and emission system.

Figure 7:
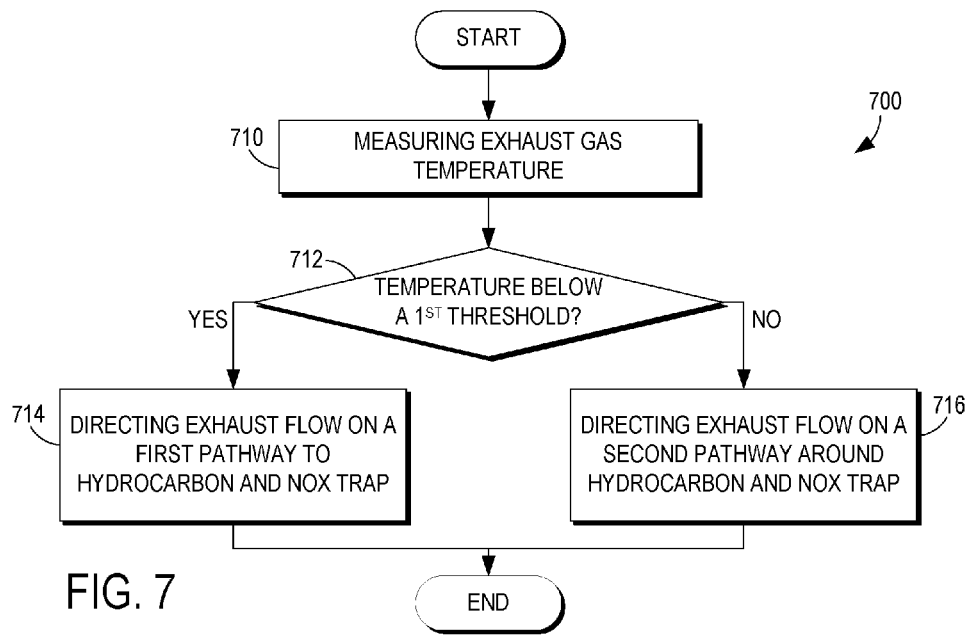
FIG. 7 illustrates an example method of controlling an example diverter valve to direct exhaust gas.

FIG. 7 illustrates an example method 700 of controlling an example diverter valve to direct exhaust gas. In some examples, the diverter valve is controlled, at least in part, based on an exhaust oxygen and/or air-to-fuel measurement. In the present example, the diverter valve is controlled based on exhaust gas temperature. Further, the diverter valve may select between a first pathway flowing exhaust to an example hydrocarbon and NOx trap, and a second pathway bypassing exhaust flow around the example hydrocarbon and NOx trap.

At 710, the method begins by measuring exhaust gas temperature. In further examples, an example emission control device temperature may be used additionally or in place of exhaust gas temperature measurements. At 712, the method continues to determine if the measured temperature is below a first threshold. In one example, such a threshold is a cold-start threshold and/or a catalyst light-off temperature.

If the temperature is below the first threshold, the method continues to 714 to directing exhaust flow on a first pathway to an example hydrocarbon and NOx trap. The first pathway may further include returning at least a portion of exhaust gas to the engine. If the temperature is determined to be below the first threshold at 712, the method continues to 716 to directing exhaust flow on a second pathway around the example hydrocarbon and NOx trap.

After exhaust flow is directed along a first or second pathway, the method may end. The method may be repeated, to provide continuous control and may be included in further control schemes, algorithms and routines.

Figure 8:
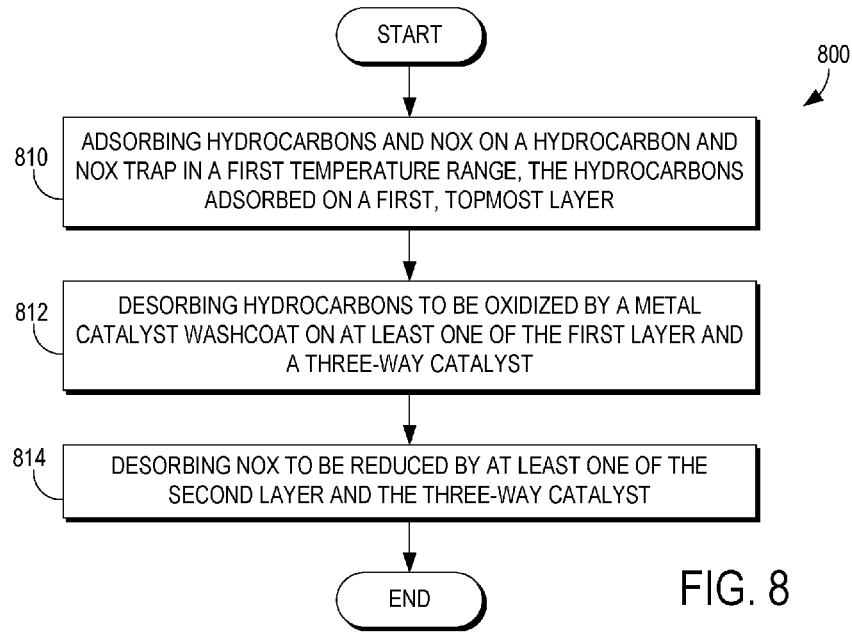
FIG. 8 illustrates an example method for reducing cold-start NOx emissions from an engine

FIG. 8 illustrates an example method 800 for reducing cold-start NOx emissions from an engine. Method 800 may be a passive event logic carried out in an example hydrocarbon and NOx trap, as described above. Method 800 is one example of operating an example hydrocarbon and NOx trap to store and/or treat exhaust emissions.

In the present example, method 800 includes at 810, adsorbing hydrocarbons and NOx on a hydrocarbon and NOx trap in a first temperature range below a three-way catalyst light off threshold. Further at 810, the hydrocarbons are adsorbed on a first, topmost layer exposed to an exhaust gas flow path of exhaust gases from the engine. The first layer may further include a zeolite, the zeolite adsorbing hydrocarbons. Also, at 810, NOx may be adsorbed on a second, middle layer, substantially covered by the top most layer, and the second layer further including a NOx adsorbing material.

After 810, the method continues to 812 to desorbing hydrocarbons to be oxidized by at least one of a metal catalyst washcoat on the first layer and a three-way catalyst. Further at 812, the desorbing of hydrocarbons may occur during a second temperature range above a hydrocarbon oxidation catalyst light-off threshold. Finally at 814 the method includes desorbing NOx to be reduced by at least one of the second layer and the three-way catalyst, the desorbing of NOx during a third temperature range above a NOx reduction catalyst light-off threshold. In additional examples, desorbing NOx may take place prior to desorbing hydrocarbons.

In some examples, the method may end after 814. In further examples the method 800 may include reacting a redox reaction including at least one of oxidizing hydrocarbons and reducing NOx, the redox reaction occurring at least one of a washcoat on the hydrocarbon and NOx trap or a catalyst external to the trap located downstream of the trap. Further the method 800 may include after at least one of 810, 812, and 814, discontinuing flow to the hydrocarbon and NOx trap in response to an exhaust temperature above a trap damage threshold. Further still, the method 800 may include, preventing at least one of hydrocarbon, sulfur and sulfur compound fouling of the second layer via the first layer stopping the travel of hydrocarbons, sulfur and sulfur compounds to the second layer.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An engine system, comprising:
a catalytic converter in an exhaust conduit;
a bypass conduit coupled in parallel with the exhaust conduit downstream of the catalytic converter;
an exhaust trap in the bypass conduit, comprising:
a first, topmost layer, exposed to an exhaust gas flow path of engine exhaust gases, comprising a zeolite;
a second layer, covered by the first layer, comprising a NOx adsorbing material; and
a monolithic substrate, directly supporting the second layer and indirectly supporting the first layer, providing a substantially rigid structure of the trap;
a fuel tank; and
a fuel system purge canister coupled between the trap and the tank.

2. The engine system of claim 1, the exhaust trap further comprising a washcoat comprising at least one of silica and a metal oxide, the at least one of silica and metal oxide increasing a surface area of the trap.

3. The engine system of claim 1, the exhaust trap further comprising a washcoat including a catalyst for at least one of a hydrocarbon oxidation reaction and a NOx reduction reaction.

4. The engine system of claim 1, the trap comprising zones, arranged one after another along a lateral direction of a brick and on the brick, the trap further comprising a first zone being at least one of a diesel oxidation catalyst, a three-way catalyst and a hydrocarbon retention device, and a second zone comprising the first layer, second layer, and substrate.

5. The engine system of claim 1, further comprising another exhaust trap located in an exhaust gas recirculation system of the engine system along an exhaust gas recirculation conduit between an intake and an exhaust of the engine system, and where an exhaust gas recirculation valve is disposed in the exhaust gas recirculation conduit.

6. The engine system of claim 1, where the monolithic substrate is a diesel particulate filter substrate.

7. The engine system of claim 1, where the second layer is a lean NOx trap and where the second layer is a middle layer between the substrate and first layer.

8. An engine system, comprising:
a combustion engine having an exhaust manifold and an intake;
a fuel system purge canister;
a fuel tank fluidly coupled to the fuel system purge canister and the intake;
a catalytic converter, the catalytic converter lowering a rate-limiting free energy change to a transition state of a reaction of at least one of reducing NOx and oxidizing hydrocarbons, the catalytic converter coupled downstream of the exhaust manifold in an exhaust conduit of the engine system;
a hydrocarbon and NOx trap fluidly coupled to the fuel system purge canister, the hydrocarbon and NOx trap comprising,
a first, topmost layer, exposable to a flow of exhaust gases from the engine, the layer comprising a zeolite,
a second, middle layer, substantially covered by the first layer, the second layer comprising a NOx adsorbing material, and
a monolithic substrate, directly supporting the second layer and indirectly supporting the first layer, the substrate providing a substantially rigid structure of the trap;
a diverter valve arranged in the exhaust conduit downstream of the catalytic converter; and
a control system including a non-transient, computer-readable medium including instructions which, when executed by a processor, control the diverter valve to:
direct exhaust flow to the hydrocarbon and NOx trap along a first pathway, upstream of the diverter valve, when an exhaust temperature is less than or equal to a catalyst light-off temperature, and
bypass exhaust flow around the hydrocarbon and NOx trap along a second pathway, downstream of the diverter valve, when the exhaust temperature is equal to or greater than the catalyst light-off temperature.

9. The engine system of claim 8, the hydrocarbon and NOx trap further comprising a first washcoat, comprising at least one of silica and a metal oxide, the at least one of silica and metal oxide increasing a surface area of the trap and the trap further comprising a second washcoat comprising a catalyst for at least one of a hydrocarbon oxidation reaction and a NOx reduction reaction.

10. The engine system of claim 8, further comprising a diesel particulate filter.

11. The engine system of claim 8, further comprising a hydrocarbon retention device in the first pathway to retain hydrocarbons during engine warm-up when the exhaust temperature is less than or equal to the catalyst light-off temperature.

12. The engine system of claim 8, where the catalytic converter is at least one of a three-way catalyst, diesel oxidation catalyst, and a selective catalytic reduction system.

13. The engine system of claim 8, the first pathway further comprising a path downstream of the hydrocarbon and NOx trap, returning exhaust gas to the engine, and the second pathway further comprising a hydrocarbon NOx trap bypass directing exhaust out of the engine system to the environment.

14. The engine system of claim 8, the second layer of the hydrocarbon and NOx trap being a lean NOx trap and the second layer being a middle layer of the trap, between the substrate and first layer.

\* \* \* \* \*